United States Patent
Zhang

(10) Patent No.: US 10,740,142 B2
(45) Date of Patent: Aug. 11, 2020

(54) SYSTEM AND METHOD FOR OBTAINING TASK TRIGGER INFORMATION BY A BASEBAND PROCESSOR OF AN INTELLIGENT DEVICE AND TRIGGERING A HOSTING TASK

(71) Applicant: Huawei Technologies Co., Ltd., Shenzhen (CN)

(72) Inventor: Yuanrong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 15/528,290

(22) PCT Filed: Nov. 20, 2014

(86) PCT No.: PCT/CN2014/091749
§ 371 (c)(1),
(2) Date: May 19, 2017

(87) PCT Pub. No.: WO2016/078053
PCT Pub. Date: May 26, 2016

(65) Prior Publication Data
US 2017/0329628 A1 Nov. 16, 2017

(51) Int. Cl.
*G06F 9/48* (2006.01)
*H04M 1/73* (2006.01)
(Continued)

(52) U.S. Cl.
CPC ........... *G06F 9/485* (2013.01); *G06F 1/3293* (2013.01); *H04M 1/73* (2013.01); *H04W 48/18* (2013.01);
(Continued)

(58) Field of Classification Search
None
See application file for complete search history.

(56) References Cited

U.S. PATENT DOCUMENTS 9,329,671 B2 * 5/2016 Heinrich .................. G06F 1/329
2003/0061355 A1 * 3/2003 Yang ........................ H04L 67/02
709/227
(Continued)

FOREIGN PATENT DOCUMENTS

CN 102082872 A 6/2011
CN 103092319 A 5/2013
(Continued)

OTHER PUBLICATIONS

ProQuest Documents, "Multiple cpu architecture platform network firewall", CN103384992A (translation) in corresponding Chinese Patent CN-103384992A (Published Nov. 6, 2013). [Retrieved on Dec. 5, 2019] (Year: 2013).*

*Primary Examiner* — Meng Ai T An
*Assistant Examiner* — Zujia Xu
(74) *Attorney, Agent, or Firm* — Slater Matsil, LLP

(57) ABSTRACT

Embodiments of the present invention disclose an intelligent device, a task processing method, and a baseband processor. An intelligent device includes a baseband processor and an application processor. The baseband processor is configured to obtain task trigger information which is used to trigger a task corresponding to an application in the intelligent device. Additionally, the baseband processor is configured to determine whether the task is a hosting task of the application, where the hosting task is a task that the application processor instructs in advance the baseband processor to process. Also, the baseband processor is configured to call and execute hosting code corresponding to the task if a detection result is that the task is the hosting task of the application.

20 Claims, 6 Drawing Sheets

(51) Int. Cl.
    *H04W 52/02*     (2009.01)
    *H04W 48/18*     (2009.01)
    *G06F 1/3293*    (2019.01)
(52) U.S. Cl.
    CPC ..... *H04W 52/028* (2013.01); *H04W 52/0229* (2013.01); *Y02D 10/122* (2018.01)

(56) References Cited

U.S. PATENT DOCUMENTS

| | | | |
|---|---|---|---|
| 2010/0069127 A1* | 3/2010 | Fiennes | H04W 52/028 455/574 |
| 2010/0153618 A1* | 6/2010 | Mathieson | G06F 13/385 711/102 |
| 2011/0151841 A1* | 6/2011 | Zhang | H04M 1/663 455/414.1 |
| 2011/0307500 A1* | 12/2011 | Li | H04L 67/24 707/755 |
| 2013/0103961 A1* | 4/2013 | Brooks | G06F 1/3203 713/320 |
| 2013/0316769 A1 | 11/2013 | Kim | |
| 2013/0331118 A1 | 12/2013 | Chhabra et al. | |
| 2014/0286308 A1 | 9/2014 | Lee et al. | |
| 2014/0365642 A1* | 12/2014 | Lam | H04W 76/10 709/224 |

FOREIGN PATENT DOCUMENTS

| | | | | |
|---|---|---|---|---|
| CN | 103384992 A | * | 11/2013 | ........... G06F 1/3209 |
| CN | 103809727 A | | 5/2014 | |

* cited by examiner

SYSTEM AND METHOD FOR OBTAINING TASK TRIGGER INFORMATION BY A BASEBAND PROCESSOR OF AN INTELLIGENT DEVICE AND TRIGGERING A HOSTING TASK

CROSS-REFERENCE TO RELATED APPLICATIONS

This application is a national stage of International Application No. PCT/CN2014/091749, filed on Nov. 20, 2014, which is hereby incorporated by reference in its entirety.

TECHNICAL FIELD

The present invention relates to the computer field, and in particular, to a task processing apparatus, an intelligent device, a task processing method, and a baseband processor.

BACKGROUND

With continuous development of the computer field and the wireless communications field, intelligent devices such as a smartphone, a tablet computer and an e-book reader become more popular. Most intelligent devices provide a user with a service by using a third party application that is installed in advance or subsequently.

An intelligent device generally includes an application processor and a baseband processor. In a task processing method provided in the prior art, various local or network tasks corresponding to an application installed in a smartphone need to be processed coordinately by the application processor and the baseband processor. To control power consumption and improve battery life of the intelligent device, when the intelligent device is in a screen locked state and there is no task to be processed coordinately by the application processor and the baseband processor, the application processor enters a sleep state, and the application processor is woken up for processing only when a task that needs to be processed coordinately by the application processor and the baseband processor is triggered.

In a process of implementing the present invention, the applicants find that at least the following defect exists in the prior art.

Most applications installed in an intelligent device need to maintain communication with a server. However, in a process of maintaining communication, many tasks that need to be processed by an application processor are generated. When many such applications are installed in the intelligent device, the application processor is frequently woken up, thereby causing a relatively poor power consumption control effect of the device.

SUMMARY

Embodiments of the present invention provide a task processing apparatus, an intelligent device, a task processing method, and a baseband processor, to resolve a problem in the prior art that an application processor is frequently woken up because many tasks that need to be processed by the application processor are generated in a process of maintaining communication between an application installed in the intelligent device and a server. The technical solutions are as follows.

According to a first aspect, a task processing apparatus is provided and is used in a baseband processor in an intelligent device, where the apparatus includes a trigger information obtaining module, configured to obtain task trigger information, where the task trigger information is used to trigger a task corresponding to an application in the intelligent device. The apparatus also includes a determining module, configured to determine whether the task is a hosting task of the application, where the hosting task is a task that an application processor in the intelligent device instructs in advance the baseband processor to process. Additionally, the apparatus includes a first execution module, configured to call and execute hosting code corresponding to the task if a determining result of the determining module is that the task is the hosting task of the application.

In a first possible implementation manner of the first aspect, the first execution module includes at least one of a first execution unit, a second execution unit, or a third execution unit. The first execution unit is configured to, when the task trigger information is information indicating that a network is available, call and execute connection setup code corresponding to the application, where the connection code is used to set up a network connection between the intelligent device and a server of the application. The second execution unit is configured to, when the task trigger information is information indicating that a network connection setup between the intelligent device and the server of the application is completed, call and execute login code corresponding to the application, where the login code is used to log in to the server of the application; and the third execution unit is configured to, when the task trigger information is information instructing to send heartbeat data to the server of the application, call and execute heartbeat data sending code corresponding to the application, where the heartbeat data sending code is used to send the heartbeat data to the server of the application.

With reference to the first aspect or the first possible implementation manner of the first aspect, in a second possible implementation manner of the first aspect, the apparatus further includes: a hosting information receiving module, configured to receive hosting information sent by the application processor before the task trigger information is obtained, where the hosting information includes a call path of the hosting code; and a first setting module, configured to set a task corresponding to the hosting code as the hosting task.

With reference to the first aspect, the first possible implementation manner of the first aspect, or the second possible implementation manner of the first aspect, in a third possible implementation manner of the first aspect, the apparatus further includes: a detection module, configured to, if the determining result of the determining module is that the task is not the hosting task of the application, detect whether the task is a wakeup task; and a second execution module, configured to call and execute wakeup code corresponding to the task if a detection result of the detection module is that the task is the wakeup task, where the wakeup code is used to wake up the application processor of the intelligent device and request the application processor to process the task.

With reference to the third possible implementation manner of the first aspect, in a fourth possible implementation manner of the first aspect, the apparatus further includes: a wakeup information receiving module, configured to receive wakeup information sent by the application processor before the task trigger information is obtained, where the wakeup information includes a call path of the wakeup code; and a second setting module, configured to set the task corresponding to the wakeup code as the wakeup task.

With reference to the first aspect or the first to the fourth possible implementation manners of the first aspect, in a fifth possible implementation manner of the first aspect, the apparatus further includes: a connection record obtaining module, configured to obtain a network connection record of the application; and an optimization module, configured to perform optimization on a network task of the application according to the network connection record.

With reference to the fifth possible implementation manner of the first aspect, in a sixth possible implementation manner of the first aspect, the optimization module includes a first optimization unit and/or a second optimization unit, where the first optimization unit is configured to skip executing the network task when the network task is to disconnect the connection between the intelligent device and the server of the application and when the network connection record indicates that duration for which the connection has been set up is less than a preset threshold; and the second optimization unit is configured to skip executing the network task when the network task is to send a network request to the server of the application and when the network connection record indicates that no response is received for a historical network request sent to the server of the application in a historical time period dating back from a current moment.

According to a second aspect, an intelligent device is provided, where the intelligent device includes a bus, and a baseband processor, an application processor, a memory, a transmitter, and a receiver that are connected to the bus; where the memory is configured to store several instructions, where the several instructions are used to be executed by the baseband processor and the application processor; the baseband processor is configured to obtain task trigger information, where the task trigger information is used to trigger a task corresponding to an application in the intelligent device; the baseband processor is configured to determine whether the task is a hosting task of the application, where the hosting task is a task that the application processor instructs in advance the baseband processor to process; and the baseband processor is configured to call and execute hosting code corresponding to the task if a detection result is that the task is the hosting task of the application.

In a first possible implementation manner of the second aspect, the baseband processor is configured to perform at least one of the following steps: calling and executing connection setup code corresponding to the application when the task trigger information is information indicating that a network is available, where the connection setup code is used to set up a network connection between the intelligent device and a server of the application; calling and executing login code corresponding to the application when the task trigger information is information indicating that a network connection setup between the intelligent device and a server of the application is completed, where the login code is used to log in to the server of the application; or calling and executing heartbeat data sending code corresponding to the application when the task trigger information is information instructing to send heartbeat data to a server of the application, where the heartbeat data sending code is used to send the heartbeat data to the server of the application. With reference to the second aspect or the first possible implementation manner of the second aspect, in a second possible implementation manner of the second aspect, the baseband processor is configured to receive hosting information sent by the application processor before the task trigger information is obtained, where the hosting information includes a call path of the hosting code; and set the task corresponding to the hosting code as the hosting task.

With reference to the second aspect, the first possible implementation manner of the second aspect, or the second possible implementation manner of the second aspect, in a third possible implementation manner of the second aspect, the baseband processor is configured to, if it is determined that the task is not a hosting task of the application, detect whether the task is a wakeup task, where the wakeup task is a task that the application processor in the intelligent device is woken up to process; and the baseband processor is configured to call and execute wakeup code corresponding to the task if it is detected that the task is the wakeup task, where the wakeup code is used to wake up the application processor of the intelligent device and request the application processor to process the task.

With reference to the third possible implementation manner of the second aspect, in a fourth possible implementation manner of the second aspect, the baseband processor is configured to receive wakeup information sent by the application processor before the task trigger information is obtained, where the wakeup information includes a call path of the wakeup code; and set the task corresponding to the wakeup code as the wakeup task.

With reference to the second aspect or any one of the first to the fourth possible implementation manners of the second aspect, in a fifth possible implementation manner of the second aspect, the baseband processor is configured to obtain a network connection record of the application, and perform optimization on a network task of the application according to the network connection record.

With reference to the fifth possible implementation manner of the second aspect, in a sixth possible implementation manner of the second aspect, the baseband processor is configured to skip executing the network task when the network task is to disconnect the connection between the intelligent device and the server of the application and when the network connection record indicates that duration for which the connection has been set up is less than a preset threshold; and/or the baseband processor is configured to skip executing the network task when the network task is to send a network request to the server of the application and when the network connection record indicates that no response is received for a historical network request sent to the server of the application in a historical time period dating back from a current moment.

According to a third aspect, a task processing method is provided and is used in an intelligent device including a baseband processor, where the method includes: obtaining, by the baseband processor, task trigger information, where the task trigger information is used to trigger a task corresponding to an application in the intelligent device; determining, by the baseband processor, whether the task is a hosting task of the application, where the hosting task is a task that an application processor in the intelligent device instructs in advance the baseband processor to process; and calling and executing, by the baseband processor, hosting code corresponding to the task if a determining result is that the task is the hosting task of the application.

In a first possible implementation of the third aspect, the executing, by the baseband processor, hosting code corresponding to the task includes at least one of the following three cases: calling and executing, by the baseband processor, connection setup code corresponding to the application when the task trigger information is information indicating that a network is available, where the connection setup code is used to set up a network connection between the intelligent device and a server of the application; calling and executing, by the baseband processor, login code corresponding to the application when the task trigger information is information indicating that a network connection setup between the intelligent device and the server of the application is completed, where the login code is used to log in to the server of the application; and calling and executing, by the baseband processor, heartbeat data sending code corresponding to the application when the task trigger information is information instructing to send heartbeat data to the server of the application, where the heartbeat data sending code is used to send the heartbeat data to the server of the application.

With reference to the third aspect or the first possible implementation manner of the third aspect, in a second possible implementation manner of the third aspect, the method further includes: receiving, by the baseband processor, hosting information sent by the application processor before the task trigger information is obtained, where the hosting information includes a call path of the hosting code; and setting, by the baseband processor, the task corresponding to the hosting code as the hosting task.

With reference to the third aspect, the first possible implementation manner of the third aspect, or the second possible implementation manner of the third aspect, in a third possible implementation manner of the third aspect, the method further includes: detecting, by the baseband processor, whether the task is a wakeup task if the determining result is that the task is not the hosting task of the application, where the wakeup task is a task that the application processor in the intelligent device is woken up to process; and calling and executing, by the baseband processor, wakeup code corresponding to the task if a detection result is that the task is the wakeup task, where the wakeup code is used to wake up the application processor of the intelligent device and request the application processor to process the task.

With reference to the third possible implementation manner of the third aspect, in a fourth possible implementation manner of the third aspect, the method further includes: receiving, by the baseband processor, wakeup information sent by the application processor before the task trigger information is obtained, where the wakeup information includes a call path of the wakeup code; and setting, by the baseband processor, the task corresponding to the wakeup code as the wakeup task.

In a fifth possible implementation manner of the third aspect, the method further includes: obtaining, by the baseband processor, a network connection record of the application; and performing, by the baseband processor, optimization on a network task of the application according to the network connection record.

With reference to the fifth possible implementation manner of the third aspect, in a sixth possible implementation manner of the third aspect, the performing, by the baseband processor, optimization on the network task of the application according to the network correction record includes: skipping, by the baseband processor, executing the network task when the network task is to disconnect the connection between the intelligent device and the server of the application and when the network connection record indicates that duration for which the connection has been set up is less than a preset threshold; and/or skipping, by the baseband processor, executing the network task when the network task is to send a network request to the server of the application and when the network connection record indicates that no response is received for a historical network request sent to the server of the application in a historical time period dating back from a current moment.

According to a fourth aspect, a baseband processor is provided, where the baseband processor includes: the task processing apparatus according to the foregoing first aspect or any one of the possible implementation manners of the first aspect.

According to a fifth aspect, a task processing method is provided and is used in an intelligent device including a baseband processor, where the method includes: obtaining, by the baseband processor, a network connection record of an application; and performing, by the baseband processor, optimization on a network task of the application according to the network connection record.

In a first possible implementation manner of the fifth aspect, the performing, by the baseband processor, optimization on the network task of the application according to the network correction record includes: skipping, by the baseband processor, executing the network task when the network task is to disconnect a connection between the intelligent device and a server of the application and when the network connection record indicates that duration for which the connection has been set up is less than a preset threshold, where the intelligent device is a device that includes the baseband processor; and/or skipping, by the baseband processor, executing the network task when the network task is to send a network request to the server of the application and when the network connection record indicates that no response is received for a historical network request sent to the server of the application in a historical time period dating back from a current moment.

According to a sixth aspect, a task processing apparatus is provided and is used in a baseband processor in an intelligent device, where the apparatus includes: a connection record obtaining module, configured to obtain a network connection record of the application; and an optimization module, configured to perform optimization on a network task of the application according to the network connection record.

With reference to the fifth possible implementation manner of the first aspect, in a sixth possible implementation manner of the first aspect, the optimization module includes a first optimization unit and/or a second optimization unit, where the first optimization unit is configured to skip executing the network task when the network task is to disconnect a connection between the intelligent device and a server of the application and when the network connection record indicates that duration for which the connection has been set up is less than a preset threshold; and the second optimization unit is configured to skip executing the network task when the network task is to send a network request to the server of the application and when the network connection record indicates that no response is received for a historical network request sent to the server of the application in a historical time period dating back from a current moment.

According to a seventh aspect, a baseband processor is provided, where the baseband processor includes: the task processing apparatus according to the foregoing sixth aspect or the first possible implementation manner of the sixth aspect.

The technical solution provided in the embodiments of the present invention brings the following beneficial effects.

A baseband processor determines whether a task corresponding to task trigger information is a hosting task of an application; if the task corresponding to the task trigger information is the hosting task of the application, the baseband processor directly calls and executes hosting code corresponding to the task, so as to execute the task. In this way, an original processing process coordinated by an application processor and the baseband processor is simplified into that individually processed by the baseband processor. This resolves a problem in the prior art that an application processor is frequently woken up because many tasks that need to be processed by the application processor are generated in a process of maintaining communication between an application installed in an intelligent device and a server and achieves objectives of reducing device power consumption in a task processing process and improving power consumption control.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

Figure 1:
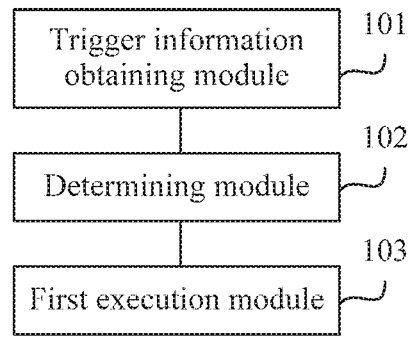
FIG. 1 is an apparatus structural diagram of a task processing apparatus according to an embodiment of the present invention.

Referring to FIG. 1, FIG. 1 shows an apparatus structural diagram of a task processing apparatus according to an embodiment of the present invention. The task processing apparatus is used in a baseband processor including an intelligent device. The intelligent device may be a smartphone, a tablet computer, an e-book reader, an intelligent wearable device, and the like. The task processing apparatus may include: a trigger information obtaining module 101, configured to obtain task trigger information, where the task trigger information is used to trigger a task corresponding to an application in the intelligent device; a determining module 102, configured to determine whether the task is a hosting task of the application, where the hosting task is a task that an application processor in the intelligent device instructs in advance the baseband processor to process; and a first execution module 103, configured to call and execute hosting code corresponding to the task if a determining result of the determining module 102 is that the task is the hosting task of the application.

In the intelligent device, the application processor is responsible for transactions at a layer higher than a session layer, and is generally responsible for application running and processing of a specific task. The baseband processor is responsible for transactions at a layer lower than a transport layer, for example, data sending and receiving. In a task processing method provided in an embodiment of the present invention, a part of tasks corresponding to the application are set as the hosting task, and the hosting task may be directly processed by the baseband processor. When the application processor is in a sleep state, if the baseband processor determines that a generated task is the hosting task, the baseband processor directly performs processing, and the application processor does not need to be woken up, so as to reduce power consumption of the application processor in this task processing process. The application processor needs to wake up all functions of the device in the task processing process, while the baseband processor needs to process only a network communication function at work. Therefore, power consumption of the baseband processor is much lower than that of the application processor. In the method illustrated in the embodiment of the present invention, an original task processing process coordinated by the application processor and the baseband processor is simplified into that individually processed by the baseband processor. This can greatly reduce device power consumption in the task processing process and improve power consumption control.

In conclusion, according to the task processing apparatus provided in this embodiment of the present invention, a baseband processor determines whether a task corresponding to task trigger information is a hosting task of an application; if the task corresponding to the task trigger information is the hosting task of the application, the baseband processor directly calls and executes hosting code corresponding to the task, so as to execute the task. In this way, an original processing process coordinated by an application processor and the baseband processor is simplified into that individually processed by the baseband processor. This resolves a problem in the prior art that an application processor is frequently woken up because many tasks that need to be processed by the application processor are generated in a process of maintaining communication between an application installed in an intelligent device and a server and achieves objectives of reducing device power consumption in a task processing process and improving power consumption control.

Figure 2:
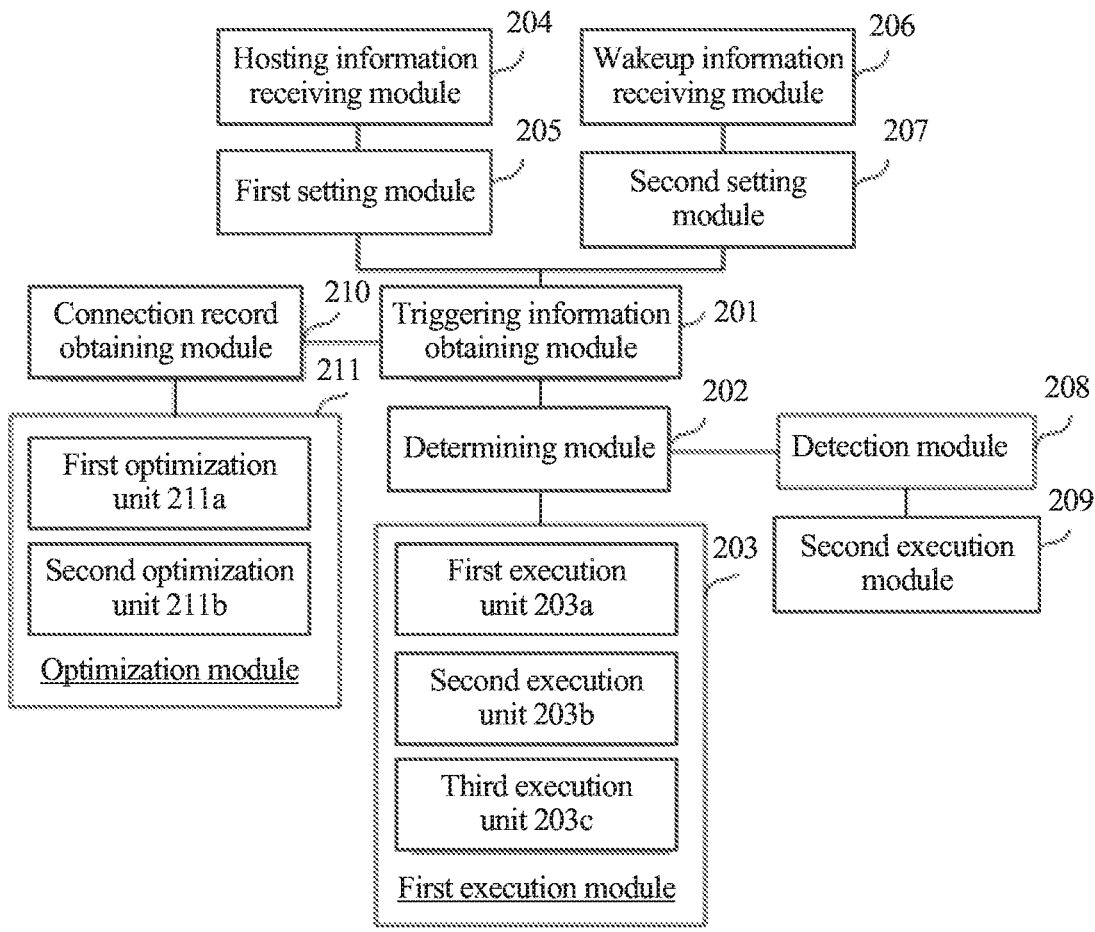
FIG. 2 is an apparatus structural diagram of a task processing apparatus according to another embodiment of the present invention.

Referring to FIG. 2, FIG. 2 shows an apparatus structural diagram of a task processing apparatus according to another embodiment of the present invention. The task processing apparatus is used in a baseband processor including an intelligent device. The intelligent device may be a smartphone, a tablet computer, an e-book reader, an intelligent wearable device, and the like. The task processing apparatus may include a trigger information obtaining module 201, a determining module 202, and a first execution module 203.

The trigger information obtaining module 201 is configured to obtain task trigger information, where the task trigger information is used to trigger a task corresponding to an application in the intelligent device.

Optionally, the apparatus further includes: a hosting information receiving module 204, configured to receive hosting information sent by an application processor before the task trigger information is obtained, where the hosting information includes a call path of hosting code; and a first setting module 205, configured to set a task corresponding to the hosting code as a hosting task.

Optionally, the apparatus further includes: a wakeup information receiving module 206, configured to receive wakeup information sent by the application processor before the task trigger information is obtained, where the wakeup information includes a call path of wakeup code; and a second setting module 207, configured to set a task corresponding to the wakeup code as a wakeup task.

Power consumption of the intelligent device mainly includes two parts: one part is referred to as valid power consumption, where the valid power consumption is consumption generated from processing a direct service task, and the direct service task is a task that directly provides a service to a user, for example, sending and receiving an SMS message, calling and being called, sending and receiving instant messaging data, and requesting and receiving network data; the other part is referred to as invalid power consumption, where the invalid power consumption is consumption generated from processing a support task, where the support task does not directly provide a service to a user but provides support to a direct service task, for example, connecting or disconnecting a network, automatically logging in to an application server, and maintaining a connection to an application server by sending and receiving heartbeat data.

In addition, tasks in the intelligent device may further be classified into two types according to a processing priority: one type is a task that is not processed in a sleep state of the intelligent device, and the other type is a task that still needs to be processed in the sleep state of the intelligent device.

In this embodiment of the present invention, with respect to the support task that generates the invalid power consumption in the intelligent device, a hosting task callback interface may be set for the task that still needs to be processed in the sleep state of the intelligent device. Typically, this type of tasks may include setting up a network connection, logging in to a server, actively sending heartbeat data, passively sending heartbeat data, and the like. For example, the hosting task callback interface that may be set may be a callback interface for setting up a connection, a callback interface to log in to a server, a callback interface for passively sending heartbeat data, a callback interface for actively sending heartbeat data, and the like. A developer of a third party application sets the hosting code corresponding to the task according to a predetermined hosting task callback interface in the intelligent device. After an application program is successfully installed in the intelligent device, when the application processor in the intelligent device runs the application for the first time, if the third party application needs to delegate a task corresponding to preset hosting code to the baseband processor for processing in a sleep of the application processor, the application processor sends, by calling an interface on a baseband processor side, the hosting information including the call path of the hosting code to the baseband processor, where the call path may be a storage path of a library file of the hosting code. The library file may be a .jar file or a .so file.

In addition, in this embodiment of the present invention, with respect to the support task that generates the valid power consumption in the intelligent device, a wakeup task callback interface may further be set for the task that still needs to be processed in the sleep state of the intelligent device. Typically, in the support task that generates the valid power consumption, the task that still needs to be processed in the sleep state of the intelligent device may include receiving an SMS message, receiving a call, and the like. For example, the developer of the third party application may further set, according to a predetermined wakeup operation callback interface in the intelligent device, the wakeup code for the task that needs to be processed by the application processor. After an application program is successfully installed in the intelligent device, when the application processor in the intelligent device runs the application for the first time, the application processor sends, by calling an interface on the baseband processor side, the wakeup information including the call path of the wakeup code to the baseband processor. Similarly, the call path may be a storage path of a library file of the wakeup code, and the library file may be a .jar file or a .so file.

Using the intelligent device being a smartphone as an example, in the smartphone, the predetermined hosting task that may be delegated to the baseband processor for management may include setting up a network connection, logging in to a server, actively sending heartbeat data, passively sending heartbeat data, or the like; the wakeup task that the application processor needs to be woken up to process may include receiving a short message service (SMS) message, receiving a call, and the like. Code of the hosting task callback interface and code of the wakeup task callback interface may be as follows:

```
Interface Channel{
    socket onConnect( ); // setting up a connection
    boolean onRequestLogin(input, output); // login
    void onReceiverHeartBeat( ); // passively sending heartbeat data
    void onReceiverHeartBeat( ); // actively sending heartbeat data
    .... // other interfaces
    // wakeup operation callback interface
    void onDataReceived(socket, datas); // waking up an application
processor to perform processing after a processing message of a wakeup
task is received
}
```

It should be noted that, in this embodiment of the present invention, the foregoing several hosting tasks and wakeup tasks are merely used as an example; in a practical application, other types of tasks may be set as the hosting task or wakeup task according to a specific case. This embodiment of the present invention sets no limitation on types of the hosting task and the wakeup task.

The baseband processor sets the task corresponding to the received hosting information as the hosting task, and sets the task corresponding to the received wakeup information as the wakeup task.

The task trigger information may be information for actively triggering the task corresponding to the application. For example, when detecting that a network is changed from unavailable to available, the intelligent device generates task trigger information that is used to indicate that the network is available, and actively triggers a task for setting up a network connection to a server of the application; when detecting that a network connection setup between the intelligent device and the server of the application is completed, the intelligent device generates task trigger information that is used to indicate a successful connection setup, and actively triggers a task to log in to the server of the application; after a successful login, when detecting that a time point to actively send heartbeat data to the server of the application arrives, the intelligent device generates task trigger information that is used to instruct to send the heartbeat data, and actively triggers a task for sending the heartbeat data to the server of the application.

In addition, the task trigger information may further be information for passively triggering the task corresponding to the application. For example, when detecting that heartbeat data sent by the server of the application is received, the intelligent device generates the task trigger information that is used to instruct to send the heartbeat data, and passively triggers the task of sending the heartbeat data to the server of the application; or, when detecting that an SMS message or a call is received, the intelligent device generates task trigger information that is used to instruct to trigger and wakeup the application processor, and passively triggers the wakeup of the application processor, so that the application processor processes an SMS message task or a call task.

The determining module 202 is configured to determine whether the task is a hosting task of the application, where the hosting task is a task that the application processor instructs in advance the baseband processor to process.

When the application processor in the intelligent device is in the sleep state, if the baseband processor receives the task trigger information, the baseband processor may first determine whether a task triggered by the task trigger information is the hosting task.

The first execution module 203 is configured to call and execute hosting code corresponding to the task if a determining result of the determining module 202 is that the task is the hosting task of the application.

Optionally, the first execution module 203 includes at least one of a first execution unit, a second execution unit, or a third execution unit; where the first execution unit 203*a* is configured to, when the task trigger information is information indicating that a network is available, call and execute connection setup code corresponding to the application, where the connection setup code is used to set up a network connection between the intelligent device and the server of the application; the second execution unit 203*b* is configured to, when the task trigger information is information indicating that a network connection setup between the intelligent device and the server of the application is completed, call and execute login code corresponding to the application, where the login code is used to log in to the server of the application; and the third execution unit 203*c* is configured to, when the task trigger information is information instructing to send heartbeat data to the server of the application, call and execute heartbeat data sending code corresponding to the application, where the heartbeat data sending code is used to send the heartbeat data to the server of the application.

If the baseband processor determines that the task triggered by the task trigger information is the set hosting task, the hosting code may be called and executed by using a corresponding call interface according to a call path of the hosting code corresponding to the task.

That the hosting information is sent to the baseband processor by using the hosting task callback interface provided by the baseband processor and after an application A is successfully installed in the smartphone is used as an example. The smartphone accesses a router. Before the router accesses a public network, the router can implement only a local area network communication function. In this case, the application A in the smartphone cannot log in to a server on a network side. After the router accesses the public network, a radio access point of the smartphone does not change, but the smartphone can exchange data with the public network. When learning that the router accesses the public network (for example, detecting that the smartphone successfully receives data sent from the network side), the baseband processor may call and execute an onConnect( ) function at a call path of connection setup code of which the application A notifies the baseband processor in advance, so as to set up a network connection between the smartphone and a server of the application A. After a network connection setup is completed, the baseband processor may call and execute an onRequestLogin(input, output) function at a call path of login code of which the application A notifies the baseband processor in advance, so as to automatically log in to the server of the application A. When the smartphone receives heartbeat data sent by the server of the application A, or a time point to send heartbeat data to the server of the application A arrives, the baseband processor calls and executes an onHearBeatTimeReceviced( ) function at a call path of heartbeat data sending code of which the application A notifies the baseband processor in advance, so as to send heartbeat data to the server of the application A.

For example, that the hosting code includes the connection setup code and the login code is used as an example, and the hosting code may be implemented as follows:

```
class WeixinChannel implements Channel {
    socket onConnect( ){// quickly connecting to a server when a connection may be implemented
        Socket socket = new Socket("192.168.0.1", 8080);
        s.connect( );
        return socket
    }
    boolean onRequestLogin(input, output){// executing a login-related operation when a connection is implemented
        output.send("xxxxxx")
        String loginResult = input.getRead( );
        If("xxxxxxxxxxx" == loginResult){
            // successful login
            return true;
        }
        return false;
    }
}
```

Optionally, the apparatus further includes:

a detection module 208, configured to detect whether the task is a wakeup task if the determining result of the determining module 202 is that the task is not the hosting task of the application; and a second execution module 209, configured to call and execute wakeup code corresponding to the task if a detection result of the detection module 208 is that the task is the wakeup task, where the wakeup code is used to wake up the application processor of the intelligent device and request the application processor to process the task.

For example, when the application processor of the smartphone is in the sleep state and receives an SMS message, the baseband processor executes the onDataReceived(socket, datas) function, to wake up the application processor in the smartphone to process the SMS message.

In a practical application, there are some tasks that do not need to be processed in the sleep state of the intelligent device, for example, a task of receiving instant messaging data or web page data. For such tasks, the baseband processor may not perform processing.

Optionally, the apparatus further includes: a connection record obtaining module 210, configured to obtain a network connection record of the application; and an optimization module 211, configured to perform optimization on a network task of the application according to the network connection record.

Optionally, the optimization module 211 includes a first optimization unit 211a and/or a second optimization unit 211b; where the first optimization unit 211a is configured to skip executing the network task when the network task is to disconnect the connection between the intelligent device and the server of the application and when the network connection record indicates that duration for which the connection has been set up is less than a preset threshold; and the second optimization unit 211b is configured to skip executing the network task when the network task is to send a network request to the server of the application and when the network connection record indicates that no response is received for a historical network request sent to the server of the application in a historical time period dating back from a current moment.

The network task is a task related to the application and for interaction with the network side, such as sending a network request, sending and receiving data, and setting up or disconnecting a connection.

Because a main task of the baseband processor is to maintain a transport layer, being familiar with a network situation enables the baseband processor to perform optimization on the network task according to the network situation, so as to reduce execution of an unnecessary network task according to a network connection status, thereby reducing device power consumption.

For example, when the smartphone runs an application, the application may continuously attempt to connect to a server. Because only one connection to the server is required at a time; when a next connection needs to be set up, an original connection needs to be disabled first, and then a new connection request is initiated. If an interval between time for disconnecting one connection and that for initiating another is too short, and duration for which the former connection has been set up is less than 2 minutes, it may be determined that this task of disconnection for another connection is an unnecessary task and may be not processed.

Alternatively, when a user browses a website by using the smartphone, resources on a web page are generally obtained concurrently, for example, multiple pictures on a same web page are obtained concurrently. Assuming that one web page is corresponding to 10 resource obtaining requests, in a request process, if the baseband processor finds that 6 consecutive requests sent in 3 minutes before the current moment all failed, in a case in which a network connection status does not change, the baseband processor does not send the remaining 4 requests temporarily.

In conclusion, according to the task processing apparatus provided in this embodiment of the present invention, a baseband processor determines whether a task corresponding to task trigger information is a hosting task of an application; if the task corresponding to the task trigger information is the hosting task of the application, the baseband processor directly calls and executes hosting code corresponding to the task, so as to execute the task. In this way, an original processing process coordinated by an application processor and the baseband processor is simplified into that individually processed by the baseband processor. This resolves a problem in the prior art that an application processor is frequently woken up because many tasks that need to be processed by the application processor are generated in a process of maintaining communication between an application installed in an intelligent device and a server and achieves objectives of reducing device power consumption in a task processing process and improving power consumption control.

In addition, according to the task processing apparatus provided in this embodiment of the present invention, the baseband processor obtains a network connection record of the application, and performs optimization on a network task of the application according to the network connection record, so as to reduce execution of an unnecessary network task according to a network connection status, thereby reducing device power consumption, and achieving an objective of further improving power consumption control.

Figure 3:
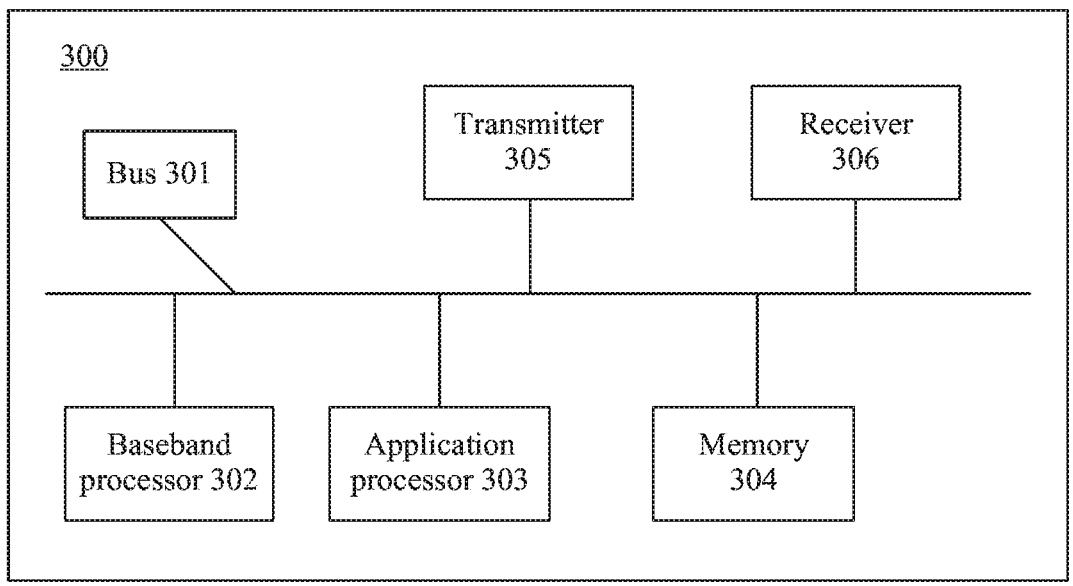
FIG. 3 is a block diagram of an intelligent device according to an embodiment of the present invention.

Referring to FIG. 3, FIG. 3 shows a block diagram of an intelligent device according to an embodiment of the present invention. The intelligent device may be a smartphone, a tablet computer, an e-book reader, an intelligent wearable device, and the like. An intelligent device 300 may include a bus 301, and a baseband processor 302, an application processor 303, a memory 304, a transmitter 305, and a receiver 306 that are connected to the bus. The memory 304 is configured to store several instructions, where the several instructions are used to be executed by the baseband processor 302 and the application processor 303; the baseband processor 302 is configured to obtain task trigger information, where the task trigger information is used to trigger a task corresponding to an application in the intelligent device; the baseband processor 302 is configured to determine whether the task is a hosting task of the application, where the hosting task is a task that an application processor in the intelligent device instructs in advance the baseband processor to process; and the baseband processor 302 is configured to call and execute hosting code corresponding to the task if a determining result is that the task is the hosting task of the application.

In the intelligent device, the application processor is responsible for transactions at a layer higher than a session layer, and is generally responsible for application running and processing of a specific task. The baseband processor is responsible for transactions at a layer lower than a transport layer, for example, data sending and receiving. In a task processing method provided in an embodiment of the present invention, a part of tasks corresponding to the application are set as the hosting task, and the hosting task may be directly processed by the baseband processor. When the application processor is in a sleep state, if the baseband processor determines that a generated task is the hosting task, the baseband processor directly performs processing, and the application processor does not need to be woken up, so as to reduce power consumption of the application processor in this task processing process. The application processor needs to wake up all functions of the device in the task processing process, while the baseband processor needs to process only a network communication function at work. Therefore, power consumption of the baseband processor is much lower than that of the application processor. In the method illustrated in the embodiment of the present invention, an original task processing process coordinated by the application processor and the baseband processor is simplified into that individually processed by the baseband processor. This can greatly reduce device power consumption in the task processing process and improve power consumption control.

In conclusion, according to the intelligent device provided in this embodiment of the present invention, a baseband processor determines whether a task corresponding to task trigger information is a hosting task of an application; if the task corresponding to the task trigger information is the hosting task of the application, the baseband processor directly calls and executes hosting code corresponding to the task, so as to execute the task. In this way, an original processing process coordinated by an application processor and the baseband processor is simplified into that individually processed by the baseband processor. This resolves a problem in the prior art that an application processor is frequently woken up because many tasks that need to be processed by the application processor are generated in a process of maintaining communication between an application installed in an intelligent device and a server and achieves objectives of reducing device power consumption in a task processing process and improving power consumption control.

Figure 4:
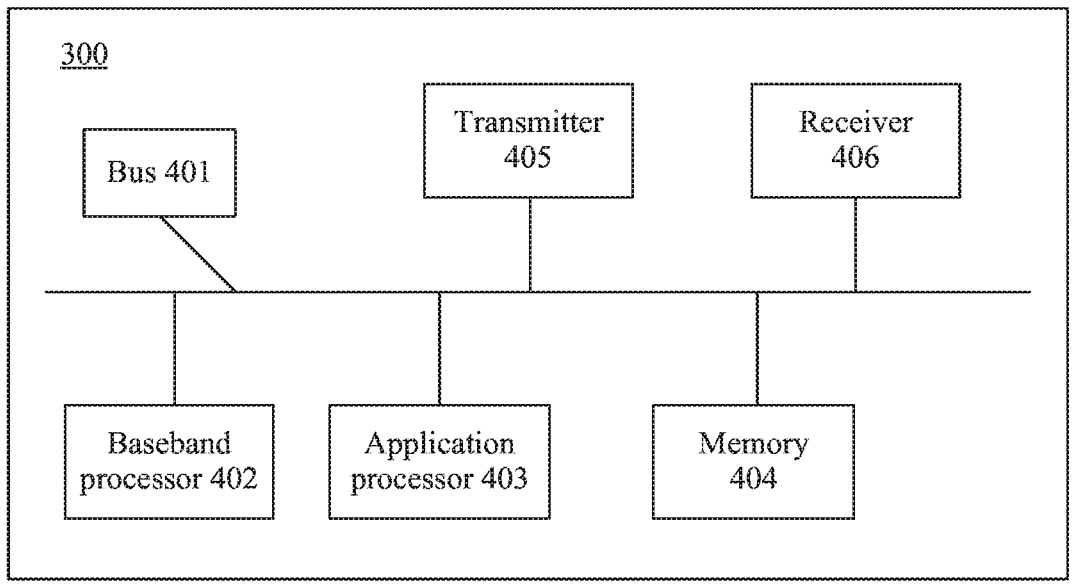
FIG. 4 is a block diagram of an intelligent device according to another embodiment of the present invention.

Referring to FIG. 4, FIG. 4 shows a block diagram of an intelligent device according to another embodiment of the present invention. The intelligent device may be a smartphone, a tablet computer, an e-book reader, an intelligent wearable device, and the like. An intelligent device 400 may include a bus 401, and a baseband processor 402, an application processor 403, a memory 404, a transmitter 405, and a receiver 406 that are connected to the bus. The memory 404 is configured to store several instructions, where the several instructions are used to be executed by the baseband processor 402 and the application processor 403; the baseband processor 402 is configured to obtain task trigger information, where the task trigger information is used to trigger a task corresponding to an application in the intelligent device; the baseband processor 402 is configured to determine whether the task is a hosting task of the application, where the hosting task is a task that an application processor in the intelligent device instructs in advance the baseband processor to process; and the baseband processor 402 is configured to call and execute hosting code corresponding to the task if a determining result is that the task is the hosting task of the application.

In the intelligent device, the application processor is responsible for transactions at a layer higher than a session layer, and is generally responsible for application running and processing of a specific task. The baseband processor is responsible for transactions at a layer lower than a transport layer, for example, data sending and receiving. In a task processing method provided in an embodiment of the present invention, a part of tasks corresponding to the application are set as the hosting task, and the hosting task may be directly processed by the baseband processor. When the application processor is in a sleep state, if the baseband processor determines that a generated task is the hosting task, the baseband processor directly performs processing, and the application processor does not need to be woken up, so as to reduce power consumption of the application processor in this task processing process. The application processor needs to wake up all functions of the device in the task processing process, while the baseband processor needs to process only a network communication function at work. Therefore, power consumption of the baseband processor is much lower than that of the application processor. In the method illustrated in the embodiment of the present invention, an original task processing process coordinated by the application processor and the baseband processor is simplified into that individually processed by the baseband processor. This can greatly reduce device power consumption in the task processing process and improve power consumption control.

Optionally, the baseband processor 402 is configured to perform at least one of the following steps: calling and executing connection setup code corresponding to the application when the task trigger information is information indicating that a network is available, where the connection setup code is used to set up a network connection between the intelligent device and a server of the application; calling and executing login code corresponding to the application when the task trigger information is information indicating that a network connection setup between the intelligent device and a server of the application is completed, where the login code is used to log in to the server of the application; or calling and executing heartbeat data sending code corresponding to the application when the task trigger information is information instructing to send heartbeat data to a server of the application, where the heartbeat data sending code is used to send the heartbeat data to the server of the application.

For a specific step in which the baseband processor calls and executes the hosting code, refer to description in the embodiment corresponding to FIG. 2, and details are not described herein.

Optionally, the baseband processor 402 is configured to receive hosting information sent by the application processor before the task trigger information is obtained, where the hosting information includes a call path of the hosting code; and set the task corresponding to the hosting code as the hosting task.

Optionally, the baseband processor 402 is configured to receive wakeup information sent by the application processor before the task trigger information is obtained, where the wakeup information includes a call path of wakeup code; and set a task corresponding to the wakeup code as a wakeup task.

The baseband processor provides a hosting task callback interface and a wakeup task callback interface externally. For a step in which the application sends the hosting information and the wakeup information to the baseband processor by the interfaces of the baseband processor, and the baseband processor sets the hosting task and the wakeup task according to the information sent by the application, refer to description in the embodiment corresponding to FIG. 2, and details are not described herein.

Optionally, the baseband processor 402 is configured to detect whether the task is the wakeup task if it is determined that the task is not the hosting task of the application, where the wakeup task is a task that the application processor in the intelligent device is woken up to process.

For a step in which the baseband processor processes the wakeup task, refer to description in the embodiment corresponding to FIG. 2, and details are not described herein.

Optionally, the baseband processor 402 is configured to obtain a network connection record of the application, and perform optimization on a network task of the application according to the network connection record.

Optionally, the baseband processor 402 is configured to skip executing the network task when the network task is to disconnect the connection between the intelligent device and the server of the application and when the network connection record indicates that duration for which the connection has been set up is less than a preset threshold; and/or the baseband processor 402 is configured to skip executing the network task when the network task is to send a network request to the server of the application and when the network connection record indicates that no response is received for a historical network request sent to the server of the application in a historical time period dating back from a current moment.

For a specific step in which the baseband processor performs optimization on the network task of the application according to a network connection status, refer to description in the embodiment corresponding to FIG. 2, and details are not described herein.

In conclusion, according to the intelligent device provided in this embodiment of the present invention, a baseband processor determines whether a task corresponding to task trigger information is a hosting task of an application; if the task corresponding to the task trigger information is the hosting task of the application, the baseband processor directly calls and executes hosting code corresponding to the task, so as to execute the task. In this way, an original processing process coordinated by an application processor and the baseband processor is simplified into that individually processed by the baseband processor. This resolves a problem in the prior art that an application processor is frequently woken up because many tasks that need to be processed by the application processor are generated in a process of maintaining communication between an application installed in an intelligent device and a server and achieves objectives of reducing device power consumption in a task processing process and improving power consumption control.

In addition, according to the intelligent device provided in this embodiment of the present invention, the baseband processor obtains a network connection record of the application, and performs optimization on a network task of the application according to the network connection record, so as to reduce execution of an unnecessary network task according to a network connection status, thereby reducing device power consumption, and achieving an objective of further improving power consumption control.

Figure 5:
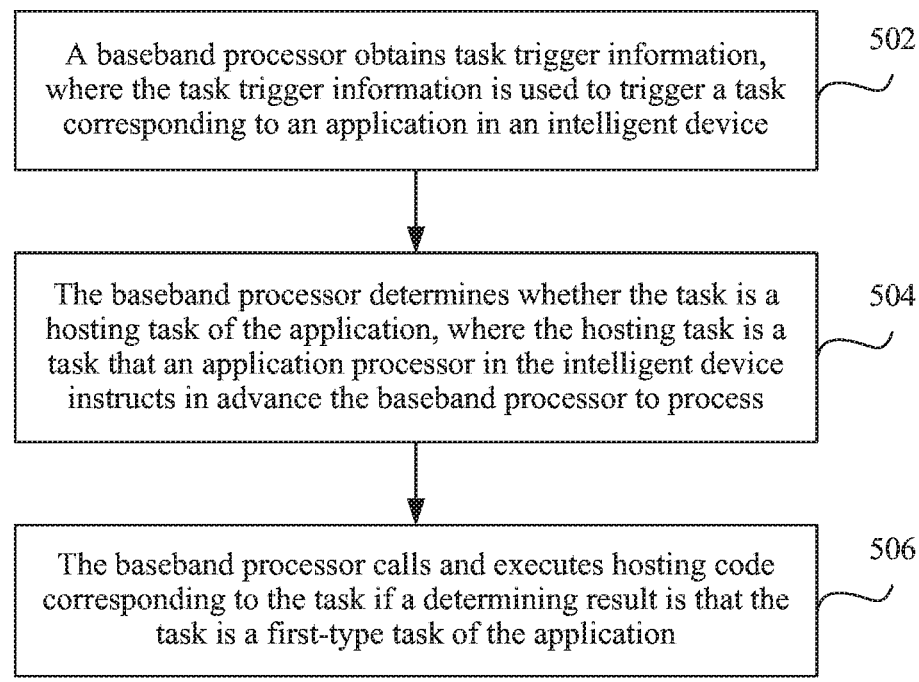
FIG. 5 is a method flowchart of a task processing method according to an embodiment of the present invention.

Referring to FIG. 5, FIG. 5 shows a method flowchart of a task processing method according to an embodiment of the present invention. The task processing method is used in an intelligent device including an application processor and a baseband processor, where the intelligent device may be a smartphone, a tablet computer, an e-book reader, an intelligent wearable device, and the like. The task processing method may include the following steps.

Step 502: The baseband processor obtains task trigger information, where the task trigger information is used to trigger a task corresponding to an application in the intelligent device.

Step 504: The baseband processor determines whether the task is a hosting task of the application, where the hosting task is a task that the application processor in the intelligent device instructs in advance the baseband processor to process.

Step 506: The baseband processor calls and executes hosting code corresponding to the task if a determining result is that the task is a first-type task of the application.

In the intelligent device, the application processor is responsible for transactions at a layer higher than a session layer, and is generally responsible for application running and processing of a specific task. The baseband processor is responsible for transactions at a layer lower than a transport layer, for example, data sending and receiving. In the task processing method provided in this embodiment of the present invention, a part of tasks corresponding to the application are set as the hosting task, and the hosting task may be directly processed by the baseband processor. When the application processor is in a sleep state, if the baseband processor determines that a generated task is the hosting task, the baseband processor directly performs processing, and the application processor does not need to be woken up, so as to reduce power consumption of the application processor in this task processing process. The application processor needs to wake up all functions of the device in the task processing process, while the baseband processor needs to process only a network communication function at work.

Therefore, power consumption of the baseband processor is much lower than that of the application processor. In the method illustrated in this embodiment of the present invention, an original task processing process coordinated by the application processor and the baseband processor is simplified into that individually processed by the baseband processor. This can greatly reduce device power consumption in the task processing process and improve power consumption control.

In conclusion, according to the task processing method provided in this embodiment of the present invention, a baseband processor determines whether a task corresponding to task trigger information is a hosting task of an application; if the task corresponding to the task trigger information is the hosting task of the application, the baseband processor directly calls and executes hosting code corresponding to the task, so as to execute the task. In this way, an original processing process coordinated by an application processor and the baseband processor is simplified into that individually processed by the baseband processor. This resolves a problem in the prior art that an application processor is frequently woken up because many tasks that need to be processed by the application processor are generated in a process of maintaining communication between an application installed in an intelligent device and a server and achieves objectives of reducing device power consumption in a task processing process and improving power consumption control.

Figure 6:
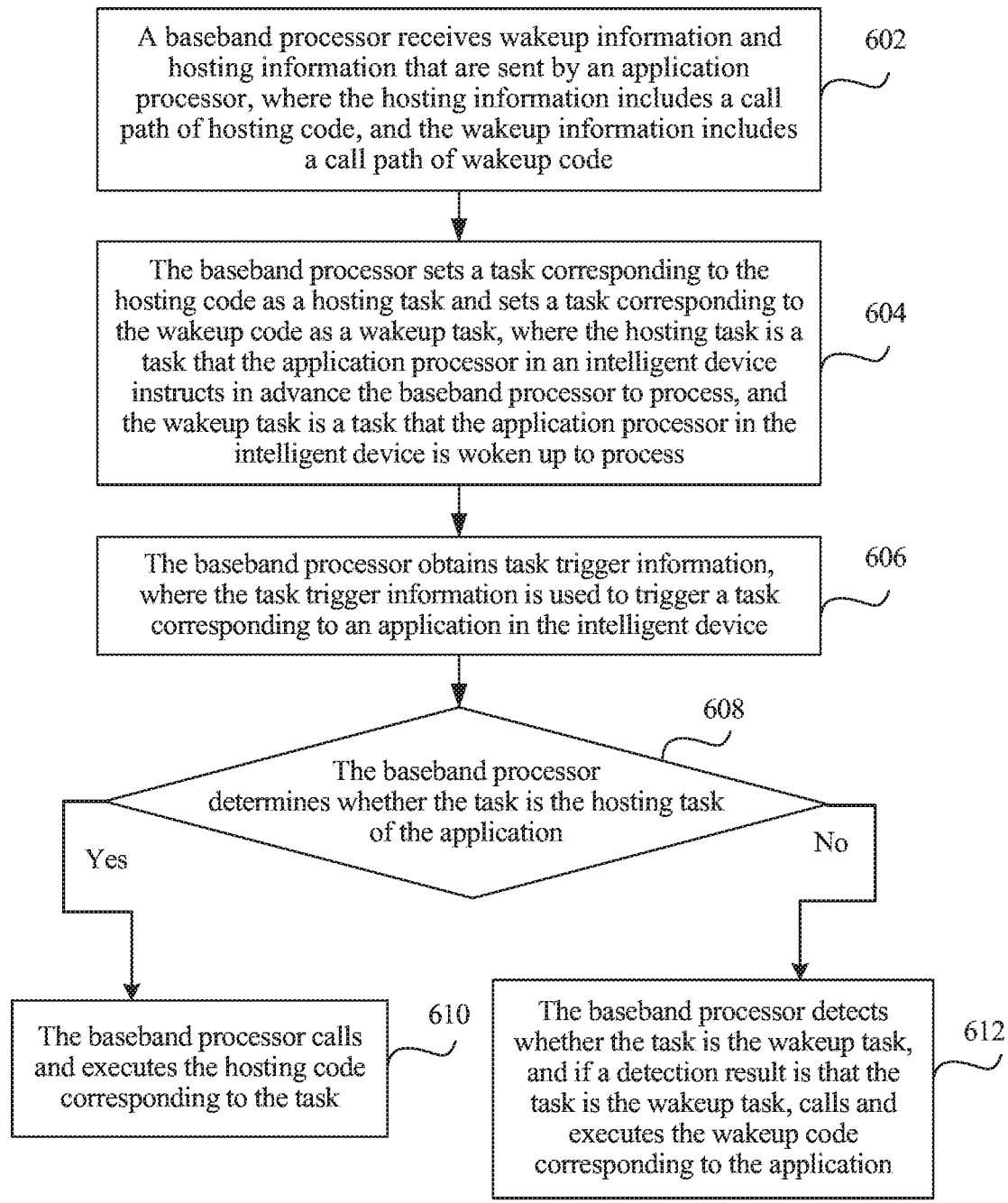
FIG. 6 is a method flowchart of a task processing method according to another embodiment of the present invention.

Referring to FIG. 6, FIG. 6 shows a method flowchart of a task processing method according to another embodiment of the present invention. This task processing method is used in an intelligent device including an application processor and a baseband processor, where the intelligent device may be a smartphone, a tablet computer, an e-book reader, an intelligent wearable device, and the like. The task processing method may include the following steps.

Step 602: The baseband processor receives wakeup information and hosting information that are sent by the application processor, where the hosting information includes a call path of hosting code, and the wakeup information includes a call path of wakeup code.

Power consumption of the intelligent device mainly includes two parts: one part is referred to as valid power consumption, where the valid power consumption is consumption generated from processing a direct service task, and the direct service task is a task that directly provides a service to a user, for example, sending and receiving an SMS message, calling and being called, sending and receiving instant messaging data, and requesting and receiving network data; the other part is referred to as invalid power consumption, where the invalid power consumption is consumption generated from processing a support task, where the support task does not directly provide a service to a user but provides support to a direct service task, for example, connecting or disconnecting a network, automatically logging in to an application server, and maintaining a connection to an application server by sending and receiving heartbeat data.

In addition, tasks in the intelligent device may further be classified into two types according to a processing priority: one type is a task that is not processed in a sleep state of the intelligent device, and the other type is a task that still needs to be processed in the sleep state of the intelligent device.

In this embodiment of the present invention, with respect to the support task that generates the invalid power consumption in the intelligent device, a hosting task callback interface may be set for the task that still needs to be processed in the sleep state of the intelligent device. Typically, this type of tasks may include setting up a network connection, logging in to a server, actively sending heartbeat data, passively sending heartbeat data, and the like. For example, the hosting task callback interface that may be set may be a callback interface for setting up a connection, a callback interface to log in to a server, a callback interface for passively sending heartbeat data, a callback interface for actively sending heartbeat data, and the like. A developer of a third party application sets the hosting code corresponding to the task according to a predetermined hosting task callback interface in the intelligent device. After an application program is successfully installed in the intelligent device, when the application processor in the intelligent device runs the third-party application for the first time, if the third party application needs to delegate a task corresponding to preset hosting code to the baseband processor for processing in a sleep of the application processor, the application processor sends, by calling an interface on a baseband processor side, the hosting information including the call path of the hosting code to the baseband processor, where the call path may be a storage path of a library file of the hosting code. The library file may be a .jar file or a .so file.

In addition, in this embodiment of the present invention, with respect to the support task that generates the valid power consumption in the intelligent device, a wakeup task callback interface may further be set for the task that still needs to be processed in the sleep state of the intelligent device. Typically, in the support task that generates the valid power consumption, the task that still needs to be processed in the sleep state of the intelligent device may include receiving an SMS message, receiving a call, and the like. For example, the developer of the third party application may further set, according to a predetermined wakeup operation callback interface in the intelligent device, the wakeup code for the task that needs to be processed by the application processor. After an application program is successfully installed in the intelligent device, when the application processor in the intelligent device runs the application for the first time, the application processor sends, by calling an interface on the baseband processor side, the wakeup information including the call path of the wakeup code to the baseband processor. Similarly, the call path may be a storage path of a library file of the wakeup code, and the library file may be a .jar file or a .so file.

Using the intelligent device being a smartphone as an example, in the smartphone, the predetermined hosting task that may be delegated to the baseband processor for management may include setting up a network connection, logging in to a server, actively sending heartbeat data, passively sending heartbeat data, or the like; the wakeup task that the application processor needs to be woken up to process may include receiving an SMS message, receiving a call, and the like. Code of the hosting task callback interface and code of the wakeup task callback interface may be as follows:

```
Interface Channel{
    socket onConnect( ); // setting up a connection
    boolean onRequestLogin(input, output); // login
    void onReceiverHeartBeat( ); // passively sending heartbeat data
    void onReceiverHeartBeat( ); // actively sending heartbeat data
    .... // other interfaces
    // wakeup operation callback interface
```

```
    void onDataReceived(socket, datas); // waking up an application
    processor to perform processing after a processing message of a wakeup
    task is received
    }
```

It should be noted that, in this embodiment of the present invention, the foregoing several hosting tasks and wakeup tasks are merely used as an example; in a practical application, other types of tasks may be set as the hosting task or wakeup task according to a specific case. This embodiment of the present invention sets no limitation on types of the hosting task and the wakeup task.

Step 604: The baseband processor sets a task corresponding to the hosting code as a hosting task and sets a task corresponding to the wakeup code as a wakeup task, where the hosting task is a task that the application processor in the intelligent device instructs in advance the baseband processor to process, and the wakeup task is a task that the application processor in the intelligent device is woken up to process.

The baseband processor sets the task corresponding to the received hosting information as the hosting task, and sets the task corresponding to the received wakeup information as the wakeup task.

Step 606: The baseband processor obtains task trigger information, where the task trigger information is used to trigger a task corresponding to an application in the intelligent device.

The task trigger information may be information for actively triggering the task corresponding to the application. For example, when detecting that a network is changed from unavailable to available, the intelligent device generates task trigger information that is used to indicate that the network is available, and actively triggers a task for setting up a network connection to a server of the application; when detecting that a network connection setup between the intelligent device and the server of the application is completed, the intelligent device generates task trigger information that is used to indicate a successful connection setup, and actively triggers a task to log in to the server of the application; after a successful login, when detecting that a time point to actively send heartbeat data to the server of the application arrives, the intelligent device generates task trigger information that is used to instruct to send the heartbeat data, and actively triggers a task for sending the heartbeat data to the server of the application.

In addition, the task trigger information may further be information for passively triggering the task corresponding to the application. For example, when detecting that heartbeat data sent by the server of the application is received, the intelligent device generates the task trigger information that is used to instruct to send the heartbeat data, and passively triggers the task of sending the heartbeat data to the server of the application; or, when detecting that an SMS message or a call is received, the intelligent device generates task trigger information that is used to instruct to trigger wakeup of the application processor, and passively triggers the wakeup of the application processor, so that the application processor processes an SMS message task or a call task.

Step 608: The baseband processor determines whether the task is the hosting task of the application; if the task is the hosting task of the application, step 610 is performed, or if the task is not the hosting task of the application, step 612 is performed.

When the application processor in the intelligent device is in the sleep state, if the baseband processor receives the task trigger information, the baseband processor may first determine whether a task triggered by the task trigger information is the hosting task.

Step 610: The baseband processor calls and executes the hosting code corresponding to the task.

If the baseband processor determines that the task triggered by the task trigger information is the set hosting task, the hosting code may be called and executed by using a corresponding call interface according to a call path of the hosting code corresponding to the task.

For example, when the task trigger information is information indicating that a network is available, the baseband processor calls and executes connection setup code corresponding to an application, where the connection setup code is used to set up a network connection between the intelligent device and a server of the application; when the task trigger information is information indicating that a network connection setup between the intelligent device and the server of the application is completed, the baseband processor calls and executes login code corresponding to the application, where the login code is used to log in to the server of the application; and when the task trigger information is information instructing to send heartbeat data to the server of the application, the baseband processor calls and executes heartbeat data sending code corresponding to the application, where the heartbeat data sending code is used to send the heartbeat data to the server of the application.

That the hosting information is sent to the baseband processor by using the hosting task callback interface provided by the baseband processor and after an application A is successfully installed in the smartphone is used as an example. The smartphone accesses a router. Before the router accesses a public network, the router can implement only a local area network communication function. In this case, the application A in the smartphone cannot log in to a server on a network side. After the router accesses the public network, a radio access point of the smartphone does not change, but the smartphone can exchange data with the public network. When learning that the router accesses the public network (for example, detecting that the smartphone successfully receives data sent from the network side), the baseband processor may call and execute an onConnect( ) function at a call path of connection setup code of which the application A notifies the baseband processor in advance, so as to set up a network connection between the smartphone and a server of the application A. After a network connection setup is completed, the baseband processor may call and execute an onRequestLogin(input, output) function at a call path of login code of which the application A notifies the baseband processor in advance, so as to automatically log in to the server of the application A. When the smartphone receives heartbeat data sent by the server of the application A, or a time point to send heartbeat data to the server of the application A arrives, the baseband processor calls and executes an onHearBeatTimeReceviced( ) function at a call path of heartbeat data sending code of which the application A notifies the baseband processor in advance, so as to send heartbeat data to the server of the application A.

For example, that the hosting code includes the connection setup code and the login code is used as an example, and the hosting code may be implemented as follows:

```
class WeixinChannel implements Channel {
    socket onConnect( ){// quickly connecting to a server when a connection may be implemented
        Socket socket = new Socket("192.168.0.1", 8080);
        s.connect( );
        return socket
    }
    boolean onRequestLogin(input, output){// executing a login-related operation when a connection is implemented
        output.send("xxxxxx")
        String loginResult = input.getRead( );
        If("xxxxxxxxxxx" == loginResult){
            // successful login
            return true;
        }
        return false;
    }
}
```

Step 612: The baseband processor detects whether the task is the wakeup task, and if a detection result is that the task is the wakeup task, call and execute wakeup code corresponding to the application.

The wakeup code is used to wake up the application processor of the intelligent device, and request the application processor to process the wakeup task.

For example, when the application processor of the smartphone is in the sleep state and receives an SMS message, the baseband processor executes the onDataReceived(socket, datas) function, to wake up the application processor in the smartphone to process the SMS message.

In a practical application, there are some tasks that do not need to be processed in the sleep state of the intelligent device, for example, a task of receiving instant messaging data or web page data. For such tasks, the baseband processor may not perform processing.

Optionally, the baseband processor may further obtain a network connection record of an application, and perform optimization on a network task of the application according to the network connection record.

The network task is a task related to the application and for interaction with the network side, such as sending a network request, sending and receiving data, and setting up or disconnecting a connection.

For example, when the network task is to disconnect the connection between the intelligent device and the server of the application, and when the network connection record indicates that duration for which the connection has been set up is less than a preset threshold, the baseband processor does not execute the network task; and/or when the network task is to send a network request to the server of the application, and when the network connection record indicates that no response is received for a historical network request sent to the server of the application in a historical time period dating back from a current moment, the baseband processor does not execute the network task.

Because a main task of the baseband processor is to maintain a transport layer, being familiar with a network situation enables the baseband processor to perform optimization on the network task according to the network situation, so as to reduce execution of an unnecessary network task according to a network connection status, thereby reducing device power consumption.

For example, when the smartphone runs an application, the application may continuously attempt to connect to a server. Because only one connection to the server is required at a time; when a next connection needs to be set up, an original connection needs to be disabled first, and then a new connection request is initiated. If an interval between time for disconnecting one connection and that for initiating another is too short, and duration for which the former connection has been set up is less than 2 minutes, it may be determined that this task of disconnection for another connection is an unnecessary task and may be not processed.

Alternatively, when a user browses a website by using the smartphone, resources on a web page are generally obtained concurrently, for example, multiple pictures on a same web page are obtained concurrently. Assuming that one web page is corresponding to 10 resource obtaining requests, in a request process, if the baseband processor finds that 6 consecutive requests sent in 3 minutes before the current moment all failed, in a case in which a network connection status does not change, the baseband processor does not send the remaining 4 requests temporarily.

In conclusion, according to the task processing method provided in this embodiment of the present invention, a baseband processor determines whether a task corresponding to task trigger information is a hosting task of an application; if the task corresponding to the task trigger information is the hosting task of the application, the baseband processor directly calls and executes hosting code corresponding to the task, so as to execute the task. In this way, an original processing process coordinated by an application processor and the baseband processor is simplified into that individually processed by the baseband processor. This resolves a problem in the prior art that an application processor is frequently woken up because many tasks that need to be processed by the application processor are generated in a process of maintaining communication between an application installed in an intelligent device and a server and achieves objectives of reducing device power consumption in a task processing process and improving power consumption control.

In addition, according to the task processing method provided in this embodiment of the present invention, the baseband processor obtains a network connection record of the application, and performs optimization on a network task of the application according to the network connection record, so as to reduce execution of an unnecessary network task according to a network connection status, thereby reducing device power consumption, and achieving an objective of further improving power consumption control.

Figure 7:
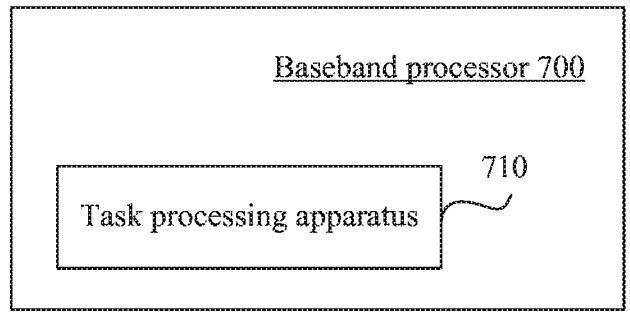
FIG. 7 is a block diagram of a baseband processor according to an embodiment of the present invention.

Referring to FIG. 7, FIG. 7 shows a block diagram of a baseband processor according to an embodiment of the present invention, where the baseband processor may be configured to implement the task processing method shown in FIG. 5 or FIG. 6. The baseband processor is used in an intelligent device, and the intelligent device may be a smartphone, a tablet computer, an e-book reader, an intelligent wearable device, and the like. A baseband processor 700 may include: a task processing apparatus 710 shown in FIG. 1 or FIG. 2.

In conclusion, the baseband processor provided in this embodiment of the present invention determines whether a task corresponding to task trigger information is a hosting task of an application; if the task corresponding to the task trigger information is the hosting task of the application, the baseband processor directly calls and executes hosting code corresponding to the task, so as to execute the task. In this way, an original processing process coordinated by an application processor and the baseband processor is simplified into that individually processed by the baseband processor. This resolves a problem in the prior art that an application processor is frequently woken up because many tasks that need to be processed by the application processor are generated in a process of maintaining communication between an application installed in an intelligent device and a server and achieves objectives of reducing device power consumption in a task processing process and improving power consumption control.

Figure 8:
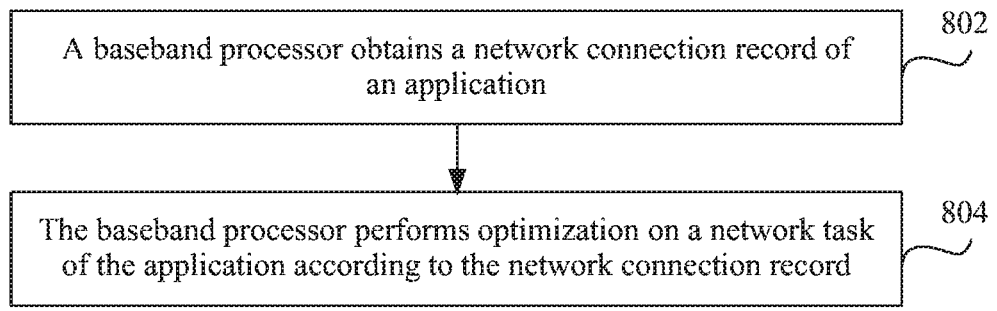
FIG. 8 is a method flowchart of a task processing method according to an embodiment of the present invention.

Referring to FIG. 8, FIG. 8 shows a method flowchart of a task processing method according to an embodiment of the present invention. This task processing method is used in an intelligent device including an application processor and a baseband processor, where the intelligent device may be a smartphone, a tablet computer, an e-book reader, an intelligent wearable device, and the like. The task processing method may include the following steps.

Step 802: The baseband processor obtains a network connection record of an application.

Step 804: The baseband processor performs optimization on a network task of the application according to the network connection record.

That the baseband processor performs optimization on a network task of the application according to the network connection record may include: skipping, by the baseband processor, executing the network task when the network task is to disconnect a connection between the intelligent device and a server of an application and when the network connection record indicates that duration for which the connection has been set up is less than a preset threshold, where the intelligent device is a device that includes the baseband processor; skipping, by the baseband processor, executing the network task when the network task is to send a network request to the server of the application and when the network connection record indicates that no response is received for a historical network request sent to a server of an application in a historical time period dating back from a current moment; or immediately executing the network task when the network task is to set up a connection to a server of an application and if the network connection record indicates that a network of the intelligent device changes from unavailable to available.

The network task is a task related to the application and for interaction with the network side, such as sending a network request, sending and receiving data, and setting up or disconnecting a connection.

Because a main task of the baseband processor is to maintain a transport layer, being familiar with a network situation enables the baseband processor to perform optimization on the network task according to the network situation, so as to reduce execution of an unnecessary network task according to a network connection status, thereby reducing device power consumption.

For example, when the smartphone runs an application, the application may continuously attempt to connect to a server. Because only one connection to the server is required at a time; when a next connection needs to be set up, an original connection needs to be disabled first, and then a new connection request is initiated. If an interval between time for disconnecting one connection and that for initiating another is too short, and duration for which the former connection has been set up is less than 2 minutes, it may be determined that this task of disconnection for another connection is an unnecessary task and may be not processed.

Alternatively, when a user browses a website by using the smartphone, resources on a web page are generally obtained concurrently, for example, multiple pictures on a same web page are obtained concurrently. Assuming that one web page is corresponding to 10 resource obtaining requests, in a request process, if the baseband processor finds that 6 consecutive requests sent in 3 minutes before the current moment all failed, in a case in which a network connection status does not change, the baseband processor does not send the remaining 4 requests temporarily.

Alternatively, the smartphone accesses a router. Before the router accesses a public network, the router can implement only a local area network communication function. In this case, an application in the smartphone cannot log in to a server on a network side. After the router accesses the public network, a radio access point of the smartphone does not change, but the smartphone can exchange data with the public network. When learning that the router accesses the public network (for example, detecting that the smartphone successfully receives data sent from the network side), the baseband processor may immediately set up a network connection between the smartphone and the server of the application, and service interruption duration is reduced.

In conclusion, according to the task processing method provided in this disclosed embodiment, a baseband processor obtains a network connection record of an application, and performs optimization on a network task of the application according to the network connection record. Because a main task of the baseband processor is to maintain a transport layer, being familiar with a network situation enables the baseband processor to perform optimization on the network task according to the network situation, so as to reduce execution of an unnecessary network task according to a network connection status, thereby reducing device power consumption.

Figure 9:
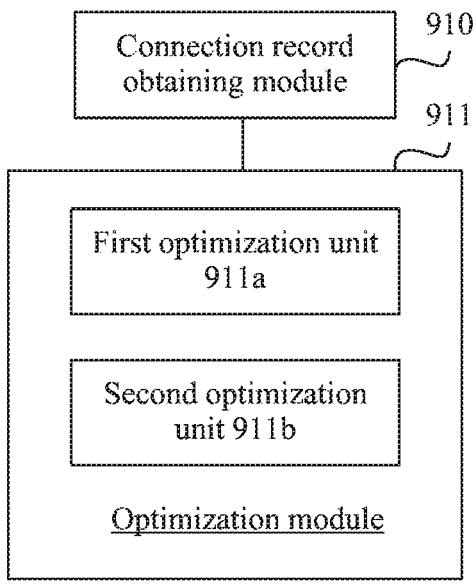
FIG. 9 is an apparatus structural diagram of a task processing apparatus according to an embodiment of the present invention.

Referring to FIG. 9, FIG. 9 shows an apparatus structural diagram of a task processing apparatus according to an embodiment of the present invention. The task processing apparatus is used in a baseband processor including an intelligent device. The intelligent device may be a smartphone, a tablet computer, an e-book reader, an intelligent wearable device, and the like. The task processing apparatus may include: a connection record obtaining module 910, configured to obtain a network connection record of an application; and an optimization module 911, configured to perform, according to the network connection record, optimization on a network task of the application.

Optionally, the optimization module 911 includes a first optimization unit 911a and/or a second optimization unit 911b; where the first optimization unit 911a is configured to skip executing the network task when the network task is to disconnect a connection between the intelligent device and a server of the application and when the network connection record indicates that duration for which the connection has been set up is less than a preset threshold; and the second optimization unit 911b is configured to skip executing the network task when the network task is to send a network request to the server of the application and when the network connection record indicates that no response is received for a historical network request sent to the server of the application in a historical time period dating back from a current moment.

The network task is a task related to the application and for interaction with the network side, such as sending a network request, sending and receiving data, and setting up or disconnecting a connection.

Because a main task of the baseband processor is to maintain a transport layer, being familiar with a network situation enables the baseband processor to perform optimization on the network task according to the network situation, so as to reduce execution of an unnecessary network task according to a network connection status, thereby reducing device power consumption.

For example, when the smartphone runs an application, the application may continuously attempt to connect to a server. Because only one connection to the server is required at a time; when a next connection needs to be set up, an original connection needs to be disabled first, and then a new connection request is initiated. If an interval between time for disconnecting one connection and that for initiating another is too short, and duration for which the former connection has been set up is less than 2 minutes, it may be determined that this task of disconnection for another connection is an unnecessary task and may be not processed.

Alternatively, when a user browses a website by using the smartphone, resources on a web page are generally obtained concurrently, for example, multiple pictures on a same web page are obtained concurrently. Assuming that one web page is corresponding to 10 resource obtaining requests, in a request process, if the baseband processor finds that 6 consecutive requests sent in 3 minutes before the current moment all failed, in a case in which a network connection status does not change, the baseband processor does not send the remaining 4 requests temporarily.

Alternatively, the smartphone accesses a router. Before the router accesses a public network, the router can implement only a local area network communication function. In this case, an application in the smartphone cannot log in to a server on a network side. After the router accesses the public network, a radio access point of the smartphone does not change, but the smartphone can exchange data with the public network. When learning that the router accesses the public network (for example, detecting that the smartphone successfully receives data sent from the network side), the baseband processor may immediately set up a network connection between the smartphone and the server of the application, and service interruption duration is reduced.

In conclusion, according to the task processing apparatus provided in this disclosed embodiment, a baseband processor obtains a network connection record of an application, and performs optimization on a network task of the application according to the network connection record. Because a main task of the baseband processor is to maintain a transport layer, being familiar with a network situation enables the baseband processor to perform optimization on the network task according to the network situation, so as to reduce execution of an unnecessary network task according to a network connection status, thereby reducing device power consumption.

Figure 10:
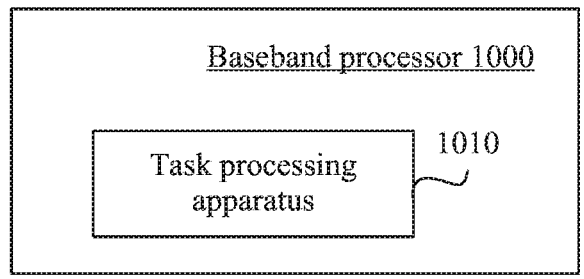
FIG. 10 is a block diagram of a baseband processor according to an embodiment of the present invention.

Referring to FIG. 10, FIG. 10 shows a block diagram of a baseband processor according to an embodiment of the present invention, where the baseband processor may be configured to implement the task processing method shown in FIG. 8. The baseband processor is used in an intelligent device, and the intelligent device may be a smartphone, a tablet computer, an e-book reader, an intelligent wearable device, and the like. A baseband processor 1000 may include: a task processing apparatus 1010 shown in the foregoing FIG. 9.

In conclusion, the baseband processor provided in this disclosed embodiment obtains a network connection record of an application, and performs optimization on a network task of the application according to the network connection record. Because a main task of the baseband processor is to maintain a transport layer, being familiar with a network situation enables the baseband processor to perform optimization on the network task according to the network situation, so as to reduce execution of an unnecessary network task according to a network connection status, thereby reducing device power consumption.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. An intelligent device, comprising:
an application processor;
a baseband processor; and
a non-transitory computer readable storage medium storing a program for execution by the baseband processor, the program including instructions to:
receive, from the application processor before the application processor is in a sleep state, hosting instructions identified by an application run on the application processor, wherein the hosting instructions are received using a first call to a first interface at the baseband processor and comprise a first call path of hosting code associated with a hosting task to be processed by the baseband processor while the application processor is in the sleep state and that is indicated by the application processor through the hosting instructions, wherein the first call path indicates a storage path of the hosting code, and wherein the hosting code comprises instructions to perform one or more tasks comprising connecting to a network, disconnecting from the network, logging in to an application server, or maintaining a connection to the application server;
receive, from the application processor before the application processor is in the sleep state, wakeup instructions identified by the application run on the application processor, wherein the wakeup instructions are received using a second call to a second interface at the baseband processor and comprise a second call path of wakeup code associated with a wakeup task to be processed by the baseband processor and that is indicated by the application processor through the wakeup instructions, wherein the second call path indicates a storage path of the wakeup code, and wherein the wakeup code comprises instructions to perform one or more tasks comprising sending a short-message-service (SMS) message, receiving another SMS message, placing a call, receiving another call, sending instant messaging data, receiving other instant messaging data, requesting network data, or receiving the network data;
obtain, by the baseband processor, while the application processor is in the sleep state, task trigger information, wherein the task trigger information identifies a task trigger that triggers a task corresponding to the application;
determine, by the baseband processor, whether a triggered task is the hosting task indicated by the hosting instructions in response to the task trigger occurring, wherein the hosting task is a task that the application processor in the intelligent device instructs in advance the baseband processor to process;
execute, by the baseband processor, in response to determining that the triggered task is the hosting task and using a corresponding call interface of the hosting code indicated by the first call path, the hosting code corresponding to the hosting task to execute the hosting task, the hosting code being executed while the application processor remains in the sleep state;
detect, by the baseband processor, in response to determining that the triggered task does not correspond to the hosting task, whether the triggered task is the wakeup task, wherein the wakeup task is a task that the application processor in the intelligent device is woken up to process; and
execute, by the baseband processor, in response to determining that the triggered task is the wakeup task and using a corresponding call interface of the wakeup code indicated by the second call path, wakeup code corresponding to the wakeup task to execute the wakeup task, wherein the wakeup code wakes up the application processor from the sleep state and requests the application processor to process the wakeup task.

2. The intelligent device according to claim 1, wherein the instructions further comprise instructions to:
execute connection setup code corresponding to the application, in response to the task trigger information indicating that a network is available, wherein the connection setup code establishes a network connection between the intelligent device and a server of the application;
execute login code corresponding to the application, in response to the task trigger information indicating that the network connection set up between the intelligent device and the server of the application is completed, wherein the login code logs in to the server of the application; and
execute heartbeat data sending code corresponding to the application, in response to the task trigger information instructing the baseband processor to send heartbeat data to the server of the application, wherein the heartbeat data sending code sends the heartbeat data to the server of the application.

3. The intelligent device according to claim 1, wherein the instructions further comprise instructions to:
receive the hosting instructions sent by the application processor before the task trigger information is obtained.

4. The intelligent device according to claim 1, wherein the instructions further comprise instructions to:
obtain a network connection record of the application; and
perform optimization on a network task of the application according to the network connection record.

5. The intelligent device according to claim 4, wherein the instructions further comprise instructions to:
skip executing the network task, in response to the network task being to disconnect a network connection between the intelligent device and a server of the application and the network connection record indicating that a duration for which the network connection has been set up is less than a preset threshold; and
skip executing the network task, in response to the network task being to send a network request to the server of the application and the network connection record indicating that no response is received for a historical network request sent to the server of the application in a historical time period dating back from a current moment.

6. The intelligent device according to claim 1, wherein the instructions to receive the hosting instructions comprise further instructions to:

receive, from the application processor before the application processor is in the sleep state, the hosting instructions indicating a hosting task that provides support to a direct service task, wherein the direct service task directly provides service to a user.

7. The intelligent device according to claim 6, wherein the hosting task that provides support to the direct service task generates invalid power consumption.

8. The intelligent device according to claim 1, wherein the instructions to receive the wakeup instructions comprise further instructions to:
receive, from the application processor before the application processor is in the sleep state, the wakeup instructions indicating a wakeup task that directly provides service to a user.

9. The intelligent device according to claim 8, wherein the wakeup task that directly provides service to the user generates valid power consumption.

10. A method, comprising:
receiving, by a baseband processor of an intelligent device, from an application processor of the intelligent device before the application processor is in a sleep state, hosting instructions identified by an application run on the application processor, wherein the hosting instructions are received using a first call to a first interface at the baseband processor and comprise a first call path of hosting code associated with a hosting task to be processed by the baseband processor while the application processor is in the sleep state and that is indicated by the application processor through the hosting instructions, wherein the first call path indicates a storage path of the hosting code, and wherein the hosting code comprises instructions to perform one or more tasks comprising connecting to a network, disconnecting from the network, logging in to an application server, or maintaining a connection to the application server;
receiving, by the baseband processor, from the application processor before the application processor is in the sleep state, wakeup instructions identified by the application run on the application processor, wherein the wakeup instructions are received using a second call to a second interface at the baseband processor and comprise a second call path of wakeup code associated with a wakeup task to be processed by the baseband processor and that is indicated by the application processor through the wakeup instructions, wherein the second call path indicates a storage path of the wakeup code, and wherein the wakeup code comprises instructions to perform one or more tasks comprising sending a short-message-service (SMS) message, receiving another SMS message, placing a call, receiving another call, sending instant messaging data, receiving other instant messaging data, requesting network data, or receiving the network data;
obtaining, by the baseband processor, while the application processor is in the sleep state, task trigger information, wherein the task trigger information identifies a task trigger that triggers a task corresponding to an application in the intelligent device;
determining, by the baseband processor, whether the triggered task is the hosting task indicated by the hosting instructions in response to the task trigger occurring, wherein the hosting task is a task that the application processor of the intelligent device instructs in advance the baseband processor to process;
executing, by the baseband processor, in response to determining that the triggered task is the hosting task and using a corresponding call interface of the hosting code indicated by the call path, hosting code corresponding to the hosting task to execute the hosting task, the hosting code being executed while the application processor remains in the sleep state;
detecting, by the baseband processor, in response to determining that the triggered task does not correspond to the hosting task, whether the triggered task is the wakeup task, wherein the wakeup task is a task that the application processor in the intelligent device is woken up to process; and
executing, by the baseband processor, in response to determining that the triggered task is the wakeup task and using a corresponding call interface of the wakeup code indicated by the second call path, wakeup code corresponding to the wakeup task to execute the wakeup task, wherein the wakeup code wakes up the application processor from the sleep state and requests the application processor to process the wakeup task.

11. The method according to claim 10, wherein executing the hosting code comprises:
executing, by the baseband processor, connection setup code corresponding to the application, in response to the task trigger information indicating that a network is available, wherein the connection setup code establishes a network connection between the intelligent device and a server of the application;
executing, by the baseband processor, login code corresponding to the application, in response to the task trigger information indicating that a network connection setup between the intelligent device and the server of the application is completed, wherein the login code logs in to the server of the application; and
executing, by the baseband processor, heartbeat data sending code corresponding to the application, in response to the task trigger information instructing to send heartbeat data to the server of the application, wherein the heartbeat data sending code sends the heartbeat data to the server of the application.

12. The method according to claim 10, wherein the method further comprises:
receiving, by the baseband processor, the hosting instructions sent by the application processor before the task trigger information is obtained.

13. The method according to claim 10, wherein the method further comprises:
obtaining, by the baseband processor, a network connection record of the application; and
performing, by the baseband processor, optimization on a network task of the application according to the network connection record.

14. The method according to claim 13, wherein performing optimization on the network task of the application comprises:
skipping, by the baseband processor, executing the network task, in response to the network task being to disconnect a network connection between the intelligent device and a server of the application and the network connection record indicating that a duration for which the network connection has been set up is less than a preset threshold; and
skipping, by the baseband processor, executing the network task, in response to the network task being to send a network request to the server of the application and the network connection record indicating that no response is received for a historical network request sent to the server of the application in a historical time period dating back from a current moment.

15. The method according to claim 10, wherein receiving the hosting instructions comprises:
receiving, from the application processor before the application processor is in the sleep state, the hosting instructions indicating a hosting task that provides support to a direct service task, wherein the direct service task directly provides service to a user.

16. The method according to claim 15, wherein the hosting task that provides support to the direct service task generates invalid power consumption.

17. The method according to claim 10, wherein receiving the wakeup instructions comprises:
receiving, from the application processor before the application processor is in the sleep state, the wakeup instructions indicating a wakeup task that directly provides service to a user.

18. The method according to claim 17, wherein the wakeup task that directly provides service to the user generates valid power consumption.

19. A method comprising:
receiving, by a baseband processor of an intelligent device, from an application processor of the intelligent device before the application processor is in a sleep state, hosting instructions identified by an application run on the application processor, wherein the hosting instructions are received using a first call to an interface at the baseband processor and comprise a first call path of hosting code associated with a hosting task to be processed by the baseband processor while the application processor is in the sleep state and that is indicated by the application processor through the hosting instructions, wherein the first call path indicates a storage path of the hosting code, and wherein the hosting code comprises instructions to perform one or more tasks comprising connecting to a network, disconnecting from the network, logging in to an application server, or maintaining a connection to the application server;
receiving, from the application processor before the application processor is in the sleep state, wakeup instructions identified by the application run on the application processor, wherein the wakeup instructions are received using a second call to a second interface at the baseband processor and comprise a second call path of wakeup code associated with a wakeup task to be processed by the baseband processor and that is indicated by the application processor through the wakeup instructions, wherein the second call path indicates a storage path of the wakeup code, and wherein the wakeup code comprises instructions to perform one or more tasks comprising sending a short-message-service (SMS) message, receiving another SMS message, placing a call, receiving another call, sending instant messaging data, receiving other instant messaging data, requesting network data, or receiving the network data;
obtaining, while the application processor is in the sleep state, by the baseband processor, task trigger information, wherein the task trigger information identifies a task trigger that triggers a task, wherein the task corresponds to the application;
obtaining, by the baseband processor, in response to the task being a network task, a network connection record of the application;
determining, by the baseband processor, in response to the task being the network task, whether the network task corresponds to the hosting task indicated by the hosting instructions in response to the task trigger occurring, wherein the hosting task is a task that the application processor in the intelligent device instructs in advance the baseband processor to process; and
performing, by the baseband processor, in response to the task being the network task and in response to the network task corresponding to the hosting task, optimization on the network task of the application, wherein performing optimization comprises determining whether to execute, using a corresponding call interface of the hosting code indicated by the first call path, the network task while the application processor remains in the sleep state, and according to the network connection record;
detect, by the baseband processor, in response to the task not being the network task and in response to determining that the task does not correspond to the hosting task, whether the task is the wakeup task, where the wakeup task is a task that the application processor in the intelligent device is woken up to process; and
execute, by the baseband processor, in response to determining that the task is the wakeup task and using a corresponding call interface of the wakeup code indicated by the second call path, wakeup code corresponding to the wakeup task to execute the wakeup task, wherein the wakeup code wakes up the application processor from the sleep state and requests the application processor to process the wakeup task.

20. The method according to claim 19, wherein performing optimization on the network task of the application comprises:
skipping, by the baseband processor, executing the network task, in response to the network task being to disconnect a connection between the intelligent device and a server of the application and the network connection record indicating that a duration for which the connection has been set up is less than a preset threshold; and
skipping, by the baseband processor, executing the network task, in response to the network task being to send a network request to the server of the application and the network connection record indicating that no response is received for a historical network request sent to the server of the application in a historical time period dating back from a current moment.

* * * * *